(12) United States Patent
Bhardwaj et al.

(10) Patent No.: US 10,853,407 B2
(45) Date of Patent: Dec. 1, 2020

(54) CORRELATING IMAGE ANNOTATIONS WITH FOREGROUND FEATURES

(71) Applicant: eBay Inc., San Jose, CA (US)

(72) Inventors: Anurag Bhardwaj, Sunnyvale, CA (US); Robinson Piramuthu, Oakland, CA (US); Vicente Ordonez-Roman, Carrboro, NC (US); Vignesh Jagadeesh, Santa Clara, CA (US); Wei Di, San Jose, CA (US)

(73) Assignee: eBay, Inc., San Jose, CA (US)

( * ) Notice: Subject to any disclaimer, the term of this patent is extended or adjusted under 35 U.S.C. 154(b) by 1006 days.

(21) Appl. No.: 14/290,754

(22) Filed: May 29, 2014

(65) Prior Publication Data
US 2015/0067471 A1 Mar. 5, 2015

Related U.S. Application Data

(60) Provisional application No. 61/874,296, filed on Sep. 5, 2013.

(51) Int. Cl.
*G06F 16/58* (2019.01)
*G06F 16/583* (2019.01)
(Continued)

(52) U.S. Cl.
CPC ............ *G06F 16/58* (2019.01); *G06F 16/50* (2019.01); *G06F 16/53* (2019.01); *G06F 16/532* (2019.01);
(Continued)

(58) Field of Classification Search
CPC ............... G06F 17/218; G06F 17/241; G06F 17/30023; G06F 17/30038;
(Continued)

(56) References Cited

U.S. PATENT DOCUMENTS 7,783,135 B2 * 8/2010 Gokturk ............ G06F 17/30253
382/209
8,320,707 B2 * 11/2012 Gokturk ............ G06F 17/30259
382/224
(Continued)

OTHER PUBLICATIONS

Chen et al., "Describing Clothing by Semantic Attributes", Department of Electrical Engineering, Stanford University, Stanford, California, Kodak Research Laboratories, Rochester, New York Cornell University, Ithaca, New York, Jul. 15, 2012, pp. 15 (Year: 2012).*
(Continued)

*Primary Examiner* — Chau T Nguyen
(74) *Attorney, Agent, or Firm* — Mintz Levin Cohn Ferris Glovsky and Popeo, P.C.

(57) ABSTRACT

A machine may be configured to execute a machine-learning process for identifying and understanding fine properties of various items of various types by using images and associated corresponding annotations, such as titles, captions, tags, keywords, or other textual information applied to these images. By use of a machine-learning process, the machine may perform property identification accurately and without human intervention. These item properties may be used as annotations for other images that have similar features. Accordingly, the machine may answer user-submitted questions, such as "What do rustic items look like?," and items or images depicting items that are deemed to be rustic can be readily identified, classified, ranked, or any suitable combination thereof.

19 Claims, 7 Drawing Sheets

(51) Int. Cl.
*G06K 9/46* (2006.01)
*G06F 16/53* (2019.01)
*G06F 16/50* (2019.01)
*G06T 7/11* (2017.01)
*G06T 7/10* (2017.01)
*G06F 16/532* (2019.01)

(52) U.S. Cl.
CPC ........ *G06F 16/583* (2019.01); *G06F 16/5838* (2019.01); *G06F 16/5846* (2019.01); *G06F 16/5854* (2019.01); *G06F 16/5862* (2019.01); *G06K 9/46* (2013.01); *G06K 9/4671* (2013.01); *G06T 7/10* (2017.01); *G06T 7/11* (2017.01)

(58) Field of Classification Search
CPC ......... G06F 17/30047; G06F 17/30244; G06F 17/30247; G06F 17/3025; G06F 17/30256; G06F 17/30259; G06F 17/30265; G06F 16/583; G06F 16/5838; G06F 16/5846; G06F 16/5854; G06F 16/5862; G06F 16/5866; G06F 16/53; G06F 16/532; G06F 16/50; G06F 16/58; G06F 9/46; G06F 9/4671; G06K 9/4671; G06T 7/10; G06T 7/11
See application file for complete search history.

(56) References Cited

U.S. PATENT DOCUMENTS

| | | | | |
|---|---|---|---|---|
| 8,909,563 | B1* | 12/2014 | Jing | G06K 9/00664 382/180 |
| 8,943,090 | B2* | 1/2015 | Dhua | G06F 16/5854 707/769 |
| 9,229,956 | B2* | 1/2016 | Ke | G06F 17/30256 |
| 9,384,218 | B2* | 7/2016 | Charikar | G06F 17/3028 |
| 9,697,233 | B2* | 7/2017 | Di | G06F 17/30247 |
| 9,830,630 | B2* | 11/2017 | Chen | G06Q 30/0623 |
| 2008/0152231 | A1* | 6/2008 | Gokturk | G06F 17/30256 382/209 |
| 2008/0317331 | A1* | 12/2008 | Winn | G06F 3/017 382/154 |
| 2009/0196505 | A1* | 8/2009 | Sullender | G06K 9/4638 382/180 |
| 2012/0207389 | A1* | 8/2012 | Ghatare | G06Q 30/02 382/173 |
| 2013/0121587 | A1* | 5/2013 | Brandt | G06K 9/6272 382/195 |
| 2013/0182909 | A1* | 7/2013 | Rodriguez-Serrano | G06K 9/34 382/105 |
| 2013/0195361 | A1* | 8/2013 | Deng | G06K 9/4671 382/195 |
| 2014/0016863 | A1* | 1/2014 | Saxena | G06F 16/5838 382/165 |
| 2014/0314313 | A1* | 10/2014 | Kennedy | G06T 7/10 382/165 |
| 2014/0369608 | A1* | 12/2014 | Wang | G06K 9/6211 382/201 |
| 2015/0049091 | A1* | 2/2015 | Nachman | G06F 17/30244 345/467 |
| 2015/0055851 | A1* | 2/2015 | Nykyforov | G06K 9/342 382/141 |

OTHER PUBLICATIONS

Vittorio Ferrari and Andrew Zisserman, "Learning Visual Attributes", University of Oxford, Nov. 23, 2007, pp. 9 (Year: 2007).*
Lempitsky et al., "Image Segmentation with a Bounding Box Prior", Microsoft Research Cambridge, Standford Vision Lab, Jul. 17, 2009, pp. 12 (Year: 2009).*
Amir Rosenfeld and Daphna Weinshall, "Extracting Foreground Masks towards Object Recognition", In Proc. 13th IEEE International Conference on Computer Vision, Barcelona, Spain, Nov. 2011, pp. 8 (Year: 2011).*
Yang et al., "Layered Object Models for Image Segmentation", Sep. 26, 2011, IEEE, pp. 15 (Year: 2011).*
Hernandez-Vela et al., "GrabCut-Based Human Segmentation in Video Sequences", Nov. 9, 2012, Open Access Sensors, ISSN 1424-8220, pp. 18 (Year: 2012).*
"Affordance", [Online]. Retrieved from the Internet: <URL: http://en.wikipedia.org/wiki/Affordable>, (May 15, 2014), 5 pgs.
Berg, Tamara L, et al., "Automatic attribute discovery and characterization from noisy web data", ECCV'10 Proceedings of the 11th European conference on Computer vision: Part I, (2010), 663-676.
Bhardwaj, A., et al., "Palette power: enabling visual search through colors", KDD '13 Proceedings of the 19th ACM SIGKDD international conference on Knowledge discovery and data mining, (2013), 1321-1329.
Blei, David M, et al., "Modeling annotated data", Proceedings of the 26th Annual International ACM SIGIR Conference on Research and Development in Informaion Retrieval, (2003), 127-134.
Bourdev, L., et al., "Poselets: Body part detectors trained using 3D human pose annotations", 2009 IEEE 12th International Conference on Computer Vision (2009), 1365-1372.
Chatfield, K., et al., "The devil is in the details: an evaluation of recent feature encoding methods", Proceedings of the British Machine Vision Conference, (2011), 76.1-76.12.
Dean, T., et al., "Fast, Accurate Detection of 100,000 Object Classes on a Single Machine", 2013 IEEE Conference on Computer Vision and Pattern Recognition (CVPR), (2013), 1814-1821.
Deng, J., et al., "ImageNet: A large-scale hierarchical image database", IEEE Conference on Computer Vision and Pattern Recognition, 2009. CVPR 2009., (2009), 248-255.
Deng, Jia, et al., "What does classifying more than 10,000 image categories tell us?", ECCV'10 Proceedings of the 11th European conference on Computer vision: Part V, (2010), 71-84.
Desai, C., et al., "Predicting Functional Regions on Objects", 2013 IEEE Conference on Computer Vision and Pattern Recognition Workshops (CVPRW), (2013), 968-975.
Duygulu, P., et al., "Object Recognition as Machine Translation: Learning a Lexicon for a Fixed Image Vocabulary", Computer Vision—ECCV 2002, Lecture Notes in Computer Science, vol. 2353, (2002), 97-112.
Everingham, M., et al., "The Pascal Visual Object Classes Challenge Workshop 2012", [Online]. Retrieved from the Internet: <URL: http://pascallin.ecs.soton.ac.uk/challenges/VOC/voc2012/workshop/index.html>, (2012), 5 pgs.
Farhadi, A., et al., "Describing objects by their attributes", IEEE Conference on Computer Vision and Pattern Recognition, 2009. CVPR 2009., (2009), 1778-1785.
Gibson, James J, "The Theory of Affordances", The Ecological Approach to Visual Perception, Hillsdale, N.J. : Lawrence Erlbaum Associates, (1986), 127-129.
Grabner, H., et al., "What makes a chair a chair?", 2011 IEEE Conference on Computer Vision and Pattern Recognition (CVPR), (2011), 1529-1536.
Juneja, M., et al., "Blocks That Shout: Distinctive Parts for Scene Classification", 2013 IEEE Conference on Computer Vision and Pattern Recognition (CVPR), (2013), 923-930.
Lampert, C. H, et al., "Learning to detect unseen object classes by between-class attribute transfer", IEEE Conference on Computer Vision and Pattern Recognition, 2009. CVPR 2009., (2009), 951-958.
Lowe, David G, et al., "Object recognition from local scale-invariant features", The Proceedings of the Seventh IEEE International Conference on Computer Vision, 1999, vol. 2, (1999), 1150-1157.
Parikh, D., et al., "Interactively building a discriminative vocabulary of nameable attributes", 2011 IEEE Conference on Computer Vision and Pattern Recognition (CVPR), (2011), 1681-1688.
Parikh, D., et al., "Relative attributes", 2011 IEEE International Conference on Computer Vision (ICCV), (2011), 503-510.

(56) References Cited

OTHER PUBLICATIONS

Parkhi, O. M, et al., "Cats and dogs", 2012 IEEE Conference on Computer Vision and Pattern Recognition (CVPR) (2012), 3498-3505.
Platt, J. C, "Probabilistic Outputs for Support Vector Machines and Comparisons to Regularized Likelihood Methods", Advances in Large Margin Classifiers, (1999), 61-74.
Rother, Carsten, et al., "GrabCut—Interactive Foreground Extraction using Iterated Graph Cuts", ACM Transactions on Graphics, 23(3), (2004), 309-314.
Toderici, G., et al., "Finding meaning on YouTube: Tag recommendation and category discovery", 2010 IEEE Conference on Computer Vision and Pattern Recognition (CVPR), (2010), 3447-3454.
Torralba, A., et al., "LabelMe: Online Image Annotation and Applications", Proceedings of the IEEE, 98(8), (Aug. 2010), 1467-1484.
Torresani, L., et al., "Efficient object category recognition using classemes", ECCV'10 Proceedings of the 11th European Conference on Computer vision: Part I, (2010), 776-789.
Wang, Gang, et al., "Joint learning of visual attributes, object classes and visual saliency", 2009 IEEE 12th International Conference on Computer Vision, (2009), 537-544.
Wang, J., et al., "Locality-constrained Linear Coding for image classification", 2010 IEEE Conference on Computer Vision and Pattern Recognition (CVPR), (2010), 3360-3367.
Welinder, P., et al., "Caltech-UCSD Birds 200", California Institute of Technology. CNS-TR-2010-001, [Online]. Retrieved from the Internet: <URL: http://www.vision.caltech.edu/visipedia/papers/WelinderEtal10_CUB-200.pdf>, (2010), 1-15.
Yao, B., et al., "Combining randomization and discrimination for fine-grained image categorization", 2011 IEEE Conference on Computer Vision and Pattern Recognition (CVPR), (2011), 1577-1584.

\* cited by examiner

CORRELATING IMAGE ANNOTATIONS WITH FOREGROUND FEATURES

RELATED APPLICATION

This application claims the priority benefit of U.S. Provisional Patent Application No. 61/874,296, filed Sep. 5, 2013, which is incorporated herein by reference in its entirety.

TECHNICAL FIELD

The subject matter disclosed herein generally relates to the processing of data. The present disclosure addresses systems and methods to facilitate image processing and usage of image data obtained from image processing.

BACKGROUND

Images can be used to convey information more efficiently or in a way not possible with text, particularly to facilitate electronic commerce ("e-commerce"). However, in order to access the wealth of information contained in images, image processing may be performed to extract, identify, or otherwise recognize attributes of the images. Once extracted, the image data can be used in a variety of applications. Depending on the particular application, certain types of image processing may be implemented over others.

BRIEF DESCRIPTION OF THE DRAWINGS

Some embodiments are illustrated by way of example and not limitation in the figures of the accompanying drawings.

DETAILED DESCRIPTION

Figure 1:
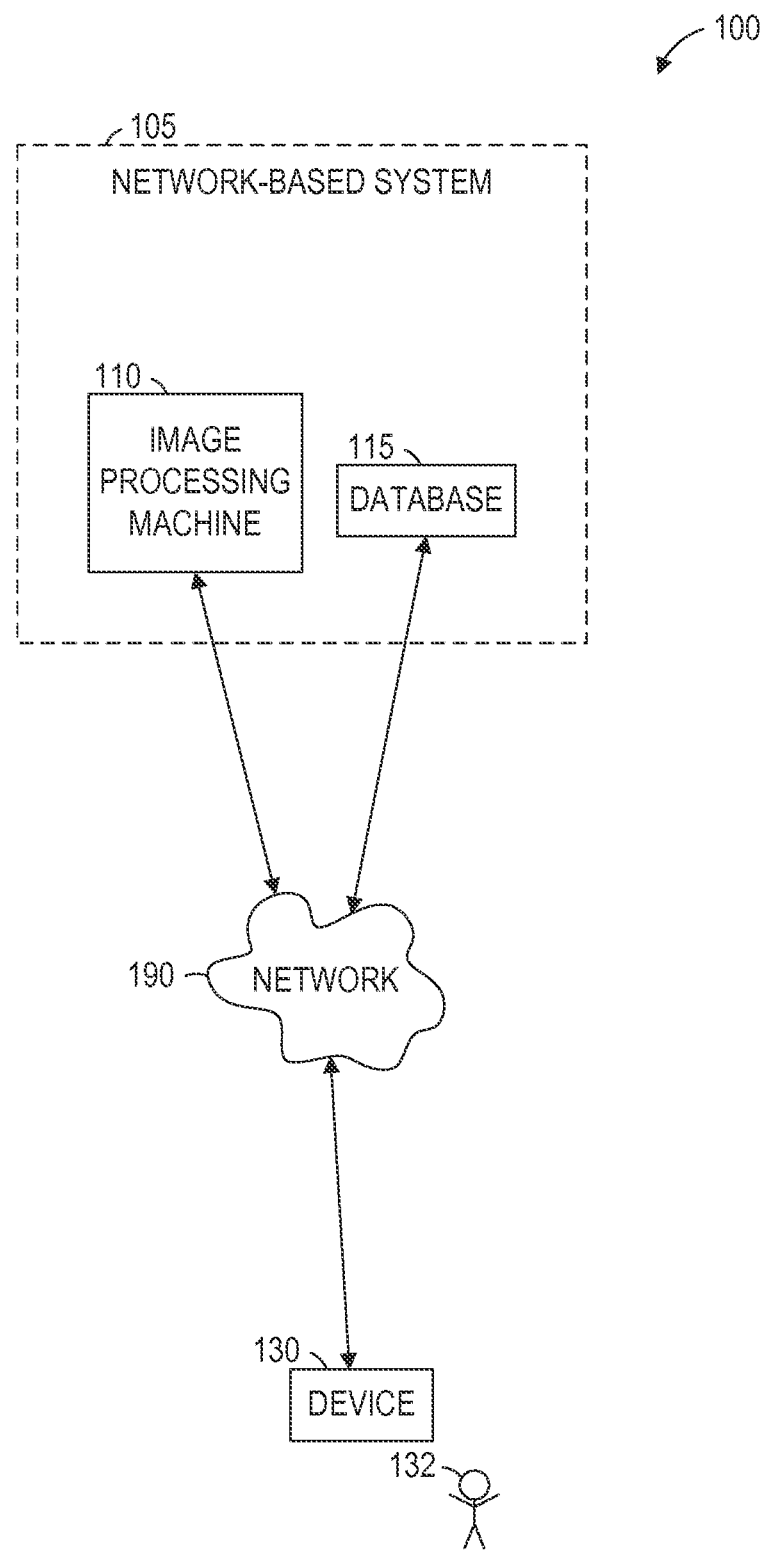
FIG. 1 is a network diagram illustrating a network environment suitable for correlating image annotations with foreground features, according to some example embodiments.

Example methods and systems are directed to correlating image annotation with one or more foreground features. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A machine may be configured (e.g., by one or more software modules) to execute a machine-learning process for identifying and understanding fine properties of various items of various types by using images (e.g., image data contained in one or more image files) and associated (e.g., corresponding) titles, captions, or other annotations (e.g., tags or other textual information) applied to these images. Images that depict items may be stored in one or more inventory databases (e.g., databases of item inventory), available on the Internet, or both. By using this machine-learning process, the machine may perform property identification accurately and without human intervention. These properties may be used as annotations for other images that have similar features. Accordingly, the machine may answer user-submitted questions, such as "What do rustic items look like?," and items or images depicting items that are deemed to be rustic can be readily identified, classified, ranked, or any suitable combination thereof (e.g., for e-commerce purposes or other downstream purposes).

There is a huge number of images on the Internet. The images are found in news articles, social networks, blogs, e-commerce websites, and the like. Large numbers of product images may also be available in one or more inventory databases. Often these images have a title, a caption, and one or more keywords associated with them (e.g., as applied by one or more users). With a large number of images, it may be beneficial to group (e.g., classify or cluster) images based on titles, captions, keywords, or other annotations (e.g., tags) and understand their content and attributes through hidden or explicit correlations, which may be machine-learned from weakly annotated and noisy data. According to the methodologies discussed herein, a system (e.g., one or more machines) may be configured to understand items (e.g., for home décor, such as furniture) through titles, captions, keywords, or other annotations associated with images of those items. Such image annotations (e.g., image tags) may contain a list of one or more name-value pairs. In some situations, annotations are not available for all images within a data set. Furthermore, there may be inconsistencies in the vocabulary used within such annotations.

However, by using the machine-learning process discussed herein, the system may be configured to understand one or more fine-grained properties of an item from an image that depicts that item. For example, the system may be configured to answer questions such as, "What are the attributes of chairs?," "What are the attributes of vintage items?," and "How do you identify sports equipment?" Associated properties of such items may be machine-learned by combining image data with annotations (e.g., titles and tags). Furniture categories are an illustrative example of why computer vision is difficult to accurately perform. For illustration purposes, the example embodiments discussed below focus on items related to home décor (e.g., furniture for decorating a home). However, it is contemplated that the methodologies discussed herein can be extended to other categories of items and are not limited to the context of home décor.

The computer vision community has used crowdsourcing for human supervision in several image understanding tasks, like general image understanding, object (e.g., item) recognition, and human pose estimation. As computer vision systems begin recognizing object categories (e.g., item categories) on the scale of thousands or hundreds of thousands, it may be difficult to scale crowdsourcing for those scenarios. Moreover, attribute-based approaches to representation of images and fine-grained categories of items may increase the computational expense of annotating images. By using one or more the methodologies described herein, it is possible to avoid explicitly asking users to annotate images with text cues, such as tags or titles. Instead, existing annotations for images may be used to automatically annotate new (e.g., previously unannotated) images. Using one or more of the methodologies described herein, a system takes advantage of annotations (e.g., tags) that have already been applied to images on e-commerce websites at which sellers, with their first-hand knowledge of their inventory of items, may have already provided accurate tags to describe images of their items.

In situations where the items depicted by images are furniture (e.g., for decorating a home), such images, items, or both may be annotated (e.g., categorized) according to their aesthetic affordances (e.g., matching a particular style), in addition to their physical appearances (e.g., shapes, colors, or textures) and physical functions (e.g., seats two people, reclines, or stores other objects). Such aesthetic affordances may be considered as possible or potential functions with respect to home décor. Accordingly, the detection of furniture items (e.g., chairs) may be difficult because, due to their aesthetically functional nature, furniture items may exhibit high intra-class variation. However, the methodologies discussed herein may easily handle such challenges by using a large set of fine-grained visual attributes to characterize and better understand furniture categories and deal with such variations in appearance.

Mining visual attributes from freely associated descriptions or tags in uncontrolled settings may run the risk of associating those visual attributes with noisy and imperfect annotations. However, using the methodologies described herein, a suitably configured system may potentially produce knowledge that would be difficult or relatively expensive to obtain with a crowdsourcing platform. For instance, it may be difficult to assess what visual feature might indicate that a chair is an accent chair. A quick search may reveal the following definition: "Accent chair: An accent chair can be used to pick up on a highlight color within the theme of a room adding visual interest and pulling a color scheme together. The accent chair is often a different style, is not part of a suite of furniture, and is often upholstered in a differently patterned fabric than the rest of the furniture in the room." In view of this definition, although an accent chair is mostly defined based on its function, a human could reasonably guess what kind of chairs might be better candidates for accent chairs given solely an image. This is because at least some of the attributes of an accent chair are at least in part visual (e.g., upholstered, adding visual interest, or patterned fabric).

Accordingly, in view of one or more of the previous considerations, a system may be configured to a) access one or more noisy image annotations as unstructured input (e.g., titles or descriptions) and semi-structured input (e.g., tags); b) implement a catalog image assumption that assumes images are biased towards the center of a picture; c) discover and learn visual attribute models from such input; and d) produce highly specialized, furniture-specific annotation suggestions for query images (e.g., novel images submitted by a user), which may include a suggestion of a furniture category. Such a system may provide the benefits of side-stepping crowdsourcing by utilizing noisy text annotations as a proxy for a crowd of users; providing a fine-grained, furniture-attribute recognition system; and performing a thorough empirical analysis of a large set of visual attributes for characteristic attributes and representative (e.g., iconic) images.

FIG. 1 is a network diagram illustrating a network environment 100 suitable for correlating an image annotation with one or more foreground features, according to some example embodiments. The network environment 100 includes an image processing machine 110, a database 115, and a device 130, all communicatively coupled to each other via a network 190. The image processing machine 110 may form all or part of a network-based system 105 (e.g., a cloud-based server system configured to provide one or more image processing services to the device 130). The image processing machine 110 and the device 130 may each be implemented in a computer system, in whole or in part, as described below with respect to FIG. 7.

Also shown in FIG. 1 is a user 132. The user 132 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the image processing machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
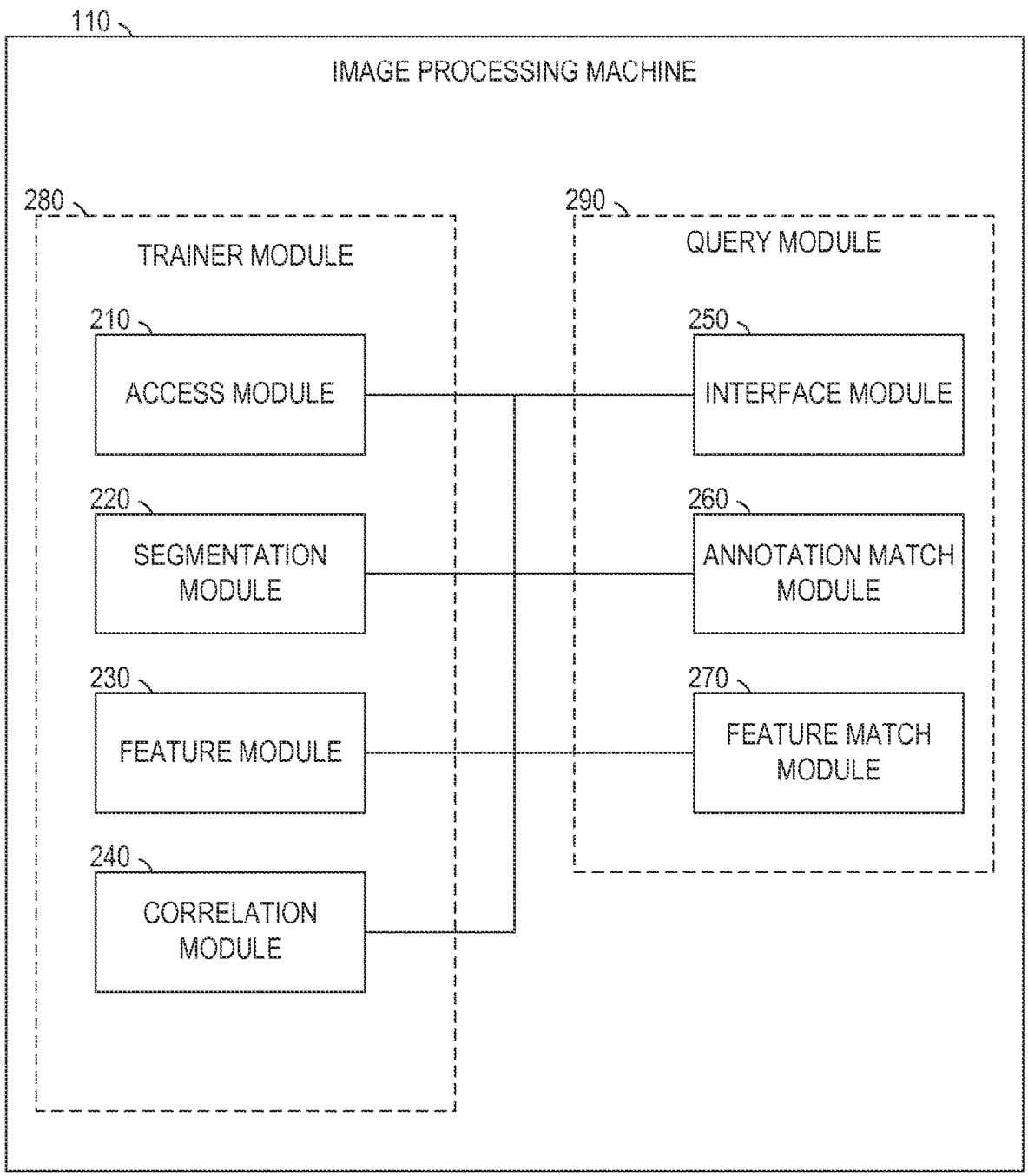
FIG. 2 is a block diagram illustrating components of an image processing machine suitable for correlating image annotations with foreground features, according to some example embodiments.

FIG. 2 is a block diagram illustrating components of the image processing machine 110, according to some example embodiments. The image processing machine 110 is shown as including an access module 210, a segmentation module 220, a feature module 230, a correlation module 240, an interface module 250, an annotation match module 260, and a feature match module 270, all configured to communicate with each other (e.g., via a bus, shared memory, or a switch). Moreover, the access module 210, the segmentation module 220, the feature module 230, the correlation module 240, or any suitable combination thereof, may form all or part of a trainer module 280 (e.g., as sub-modules). As described in greater detail below, the trainer module 280 may perform one or more operations during a training phase for the image processing machine 110 (e.g., training or otherwise configuring the database 115 for subsequent operations). Furthermore, the interface module 250, the annotation match module 260, the feature match module 270, or any suitable combination thereof, may form all or part of a query module 290 (e.g., as sub-modules). As described in greater detail below, the query module 290 may perform one or more operations during a post-training phase (e.g., a query phase) for the image processing machine 110 (e.g., responding to one or more queries submitted from the device 130 by the user 132).

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
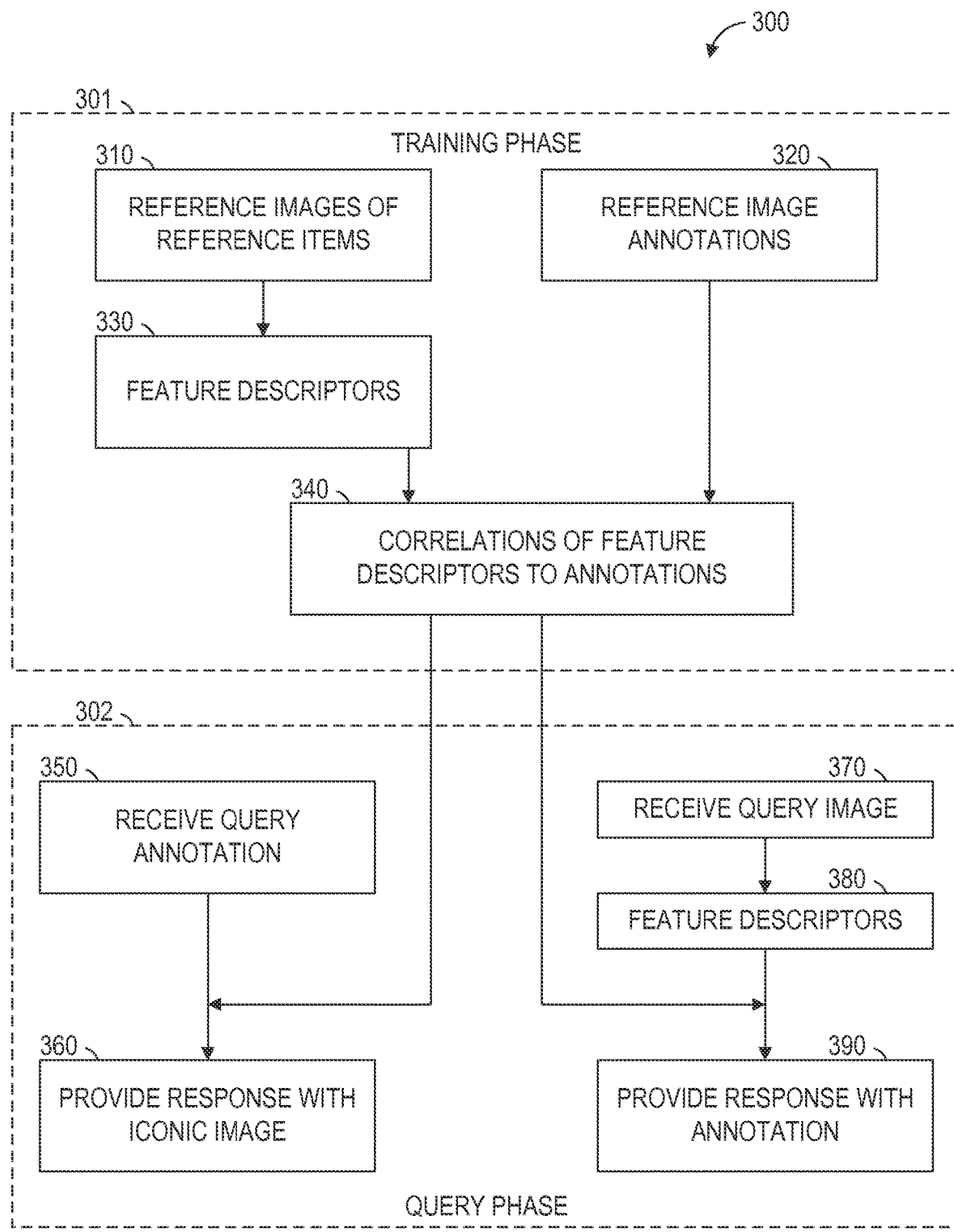
FIG. 3 is a block diagram illustrating a workflow that utilizes the image processing machine, according to some example embodiments.

FIG. 3 is a block diagram illustrating a workflow 300 that utilizes the image processing machine 110, according to some example embodiments. The workflow 300 may include two phases, specifically, a training phase 301 and a query phase 302 (e.g., a runtime phase, a usage phase, or other post-training phase). The training phase 301 includes blocks 310, 320, 330, and 340. At block 310, reference images of reference items (e.g., an image depicting a chair) are accessed by the image processing machine 110 (e.g., from the database 115). At block 320, reference image annotations (e.g., titles, captions, descriptions, or tags) that have been previously associated with (e.g., applied to) the reference images (e.g., by one or more users, such as the user 132) are accessed by the image processing machine 110 (e.g., from the database 115).

At block 330, the image processing machine 110 calculates feature descriptors (e.g., vectors that encode or otherwise represent visual features as visual words) from the reference images (e.g., from foreground portions segmented from the reference images). In some example embodiments, each feature descriptor is a different visual word, while in alternative example embodiments, feature descriptors from multiple reference images may be clustered (e.g., using any suitable clustering algorithm, such as K-means clustering) such that each cluster of feature descriptors represents a different visual word. At block 340, correlations of the feature descriptors to the reference image annotations are generated and stored by the image processing machine 110 (e.g., as a data structure generated in memory and then stored within the database 115).

The query phase 302 includes one or more of blocks 350, 360, 370, 380, and 390. Implementation of blocks 350 and 360 in the workflow 300 enables the image processing machine 110 to provide (e.g., as a suggestion) an iconic image in response to a query in which the user 132 submits an annotation (e.g., tag) and seeks to receive a representative image characterized by the submitted annotation. At block 350, a query annotation is received by the image processing machine 110 (e.g., from the device 130 via the network 190). At block 360, the image processing machine 110 provides a response that includes a reference image (e.g., as the iconic image), based on the previously generated correlations between feature descriptors and annotations (e.g., by accessing the correlations from the database 115).

Implementation of blocks 370, 380, and 390 in the workflow 300 enables the image processing machine 110 to provide (e.g., as a suggestion) a reference image annotation in response to a query in which the user 132 submits a query image (e.g., as a new or previously unannotated image of an item). At block 370, a query image is received by the image processing machine 110 (e.g., from the device 130 via the network 190). At block 380, the image processing machine 110 calculates one or more feature descriptors from the query image (e.g., from a foreground portion segmented from the query image). Operations performed with respect to block 380 may be similar to those performed with respect to block 330. At block 390, the image processing machine 110 provides a response that includes a reference annotation of a reference image (e.g., as a suggested characterization of the query image), based on the previously generated correlations between feature descriptors and annotations (e.g., by accessing the correlations from the database 115).

Figure 4:
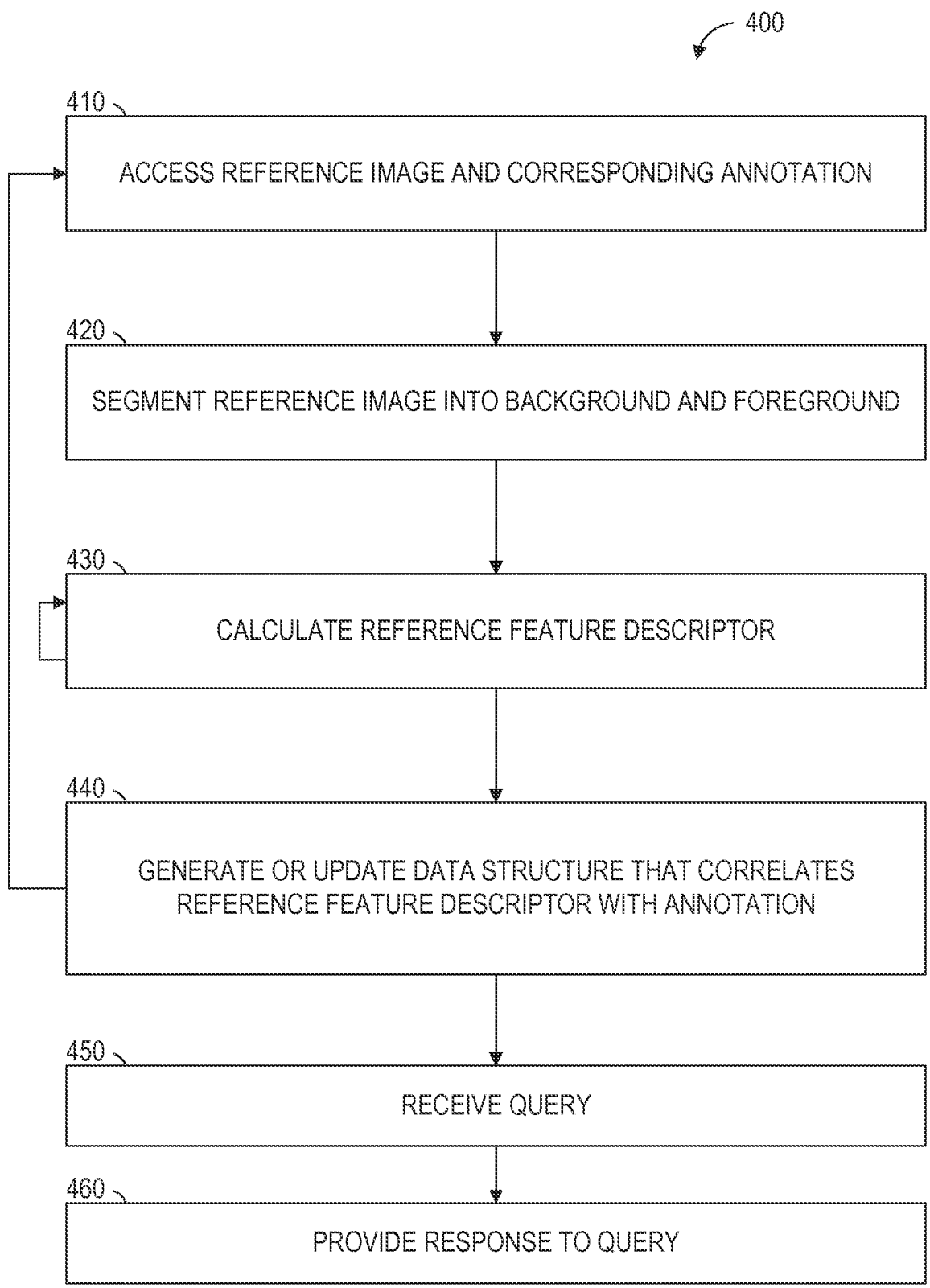
FIGS. 4-6 are flowcharts illustrating operations of the image processing machine in performing a method of correlating image annotations with foreground features, according to some example embodiments.
Figure 5:
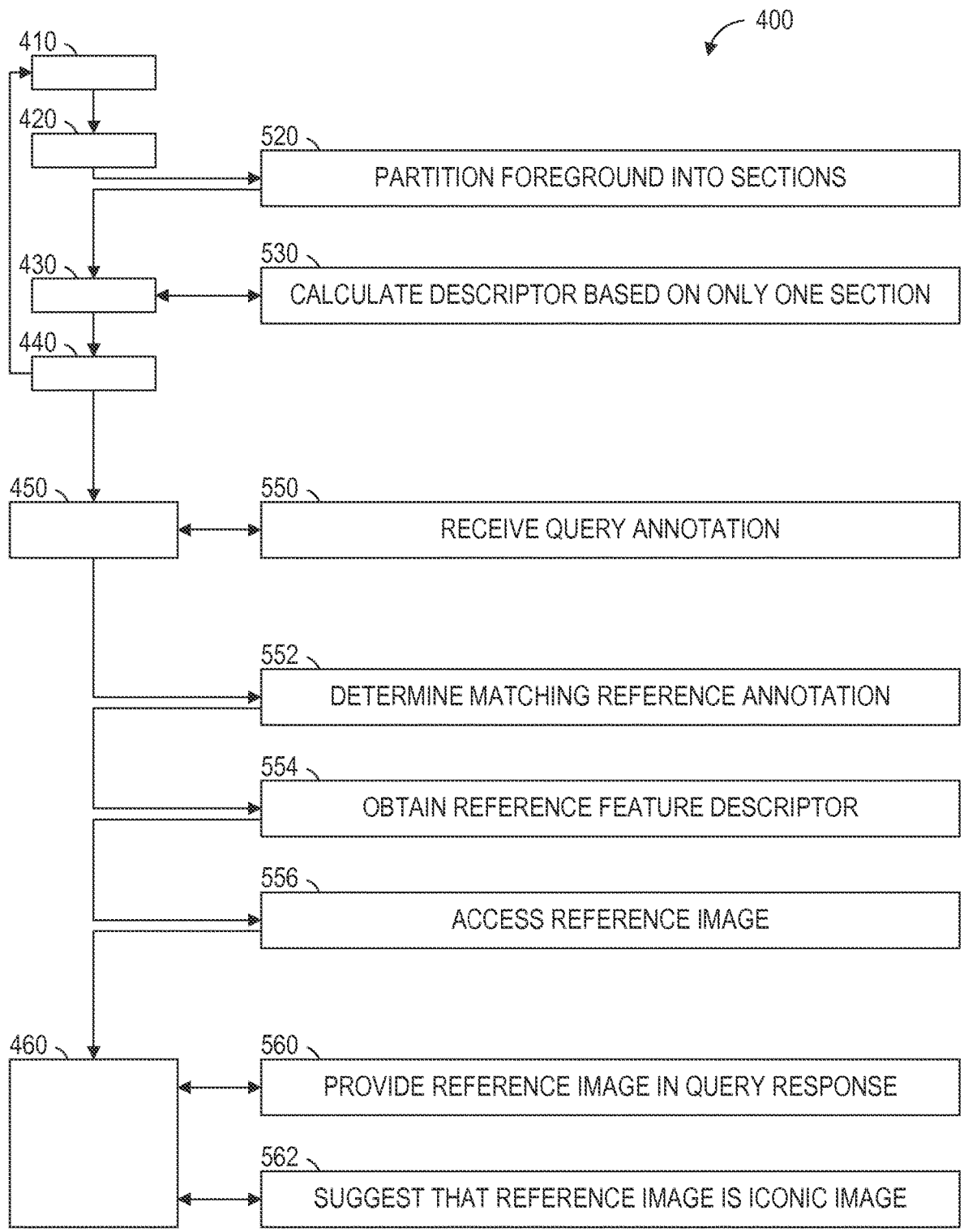
Figure 6:
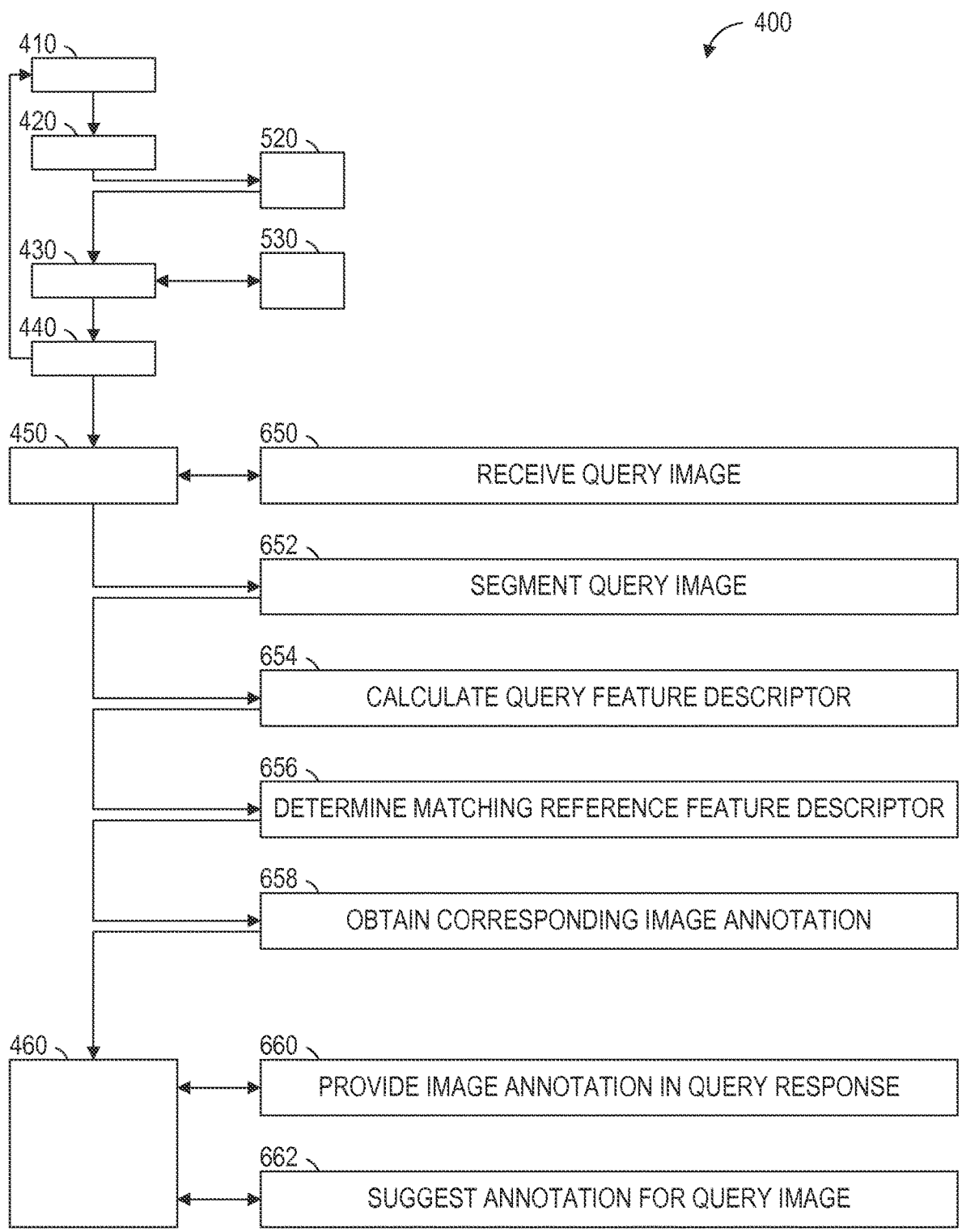

FIGS. 4-6 are flowcharts illustrating operations of the image processing machine 110 in performing a method 400 of correlating an image annotation with a foreground feature of an image, according to some example embodiments. Operations in the method 400 may be performed by the image processing machine 110, using modules described above with respect to FIG. 2. As shown in FIG. 4, the method 400 includes operations 410, 420, 430, 440, 450, and 460. Operations 410, 420, 430, and 440 may form all or part of the training phase 301 of the workflow 300. Operations 450 and 460 may form all or part of the query phase 302 of the workflow 300.

In operation 410, the access module 210 (e.g., within the trainer module 280) accesses a reference image of a reference item (e.g., a reference image that depicts the reference item) and a corresponding image annotation (e.g., a tag applied to the reference image). As noted above, the image annotation may have been previously associated with (e.g., applied to) the reference image by one or more users (e.g., user 132) of the image processing machine 110. Moreover, the image annotation may be descriptive of a visual appearance of the reference item that is depicted in the reference image. As also noted above, the image annotation may be or include an n-gram that is included within a title or caption of the reference image (e.g., a title or caption within metadata of the reference image). In some example embodiments, such a title or caption was previously submitted (e.g., as metadata of the reference image) by a seller of the reference item that is depicted in the reference image. In certain example embodiments, the image annotation is or includes a keyword that was previously submitted as a tag for the image (e.g., by the seller of the reference item). As further noted above, the image annotation may be or include a name value pair that specifies an attribute of the reference item. Furthermore, the image annotation may indicate an affordance of the depicted reference item (e.g., indicate an available aesthetic function of the reference item). The reference image may be accessed from the database 115.

In one example embodiment, the database 115 may store 120,000 reference images of furniture, with associated titles, captions, descriptions, and user-supplied tags (e.g., as supplied from an e-commerce application). For example, the reference images may include depictions of various furniture items that collectively represent 22 furniture categories (e.g., 9827 images of "tables" and 807 images of "vanities & makeup tables"). According to some example embodiments, the reference images stored in the database 115 may be pre-filtered to include only those that have been annotated by top sellers (e.g., as rated by an electronic marketplace). This may have the effect of obtaining richer descriptions from users who are more likely to be domain experts. Thus, the image processing machine 110 may provide more accurate responses (e.g., suggestions of annotations or iconic images) to beginner users by leveraging the knowledge of more advanced users (e.g., the top sellers).

In one example embodiment of the database 115, each reference image has a title (e.g., a descriptive title), and roughly 80,000 reference images have at least one annotation (e.g., tags). Accordingly, the set of annotations may be very rich, for example, with a total of 367 unique tag-value pairs that are associated with (e.g., applied to) at least 200 reference images each. According to certain example embodiments, the annotations of the reference images may be preprocessed to provide some structure. For example, the image processing machine 110 may compute all possible n-grams up to 5-grams in length and count the occurrence of each n-gram across the entire set of reference images and the database 115. Such pre-processing may result in 876 n-grams that are each associated with at least 200 reference images. These 876 n-grams may be combined with the 367 unique tag-value pairs to obtain 1243 reference annotations. These reference annotations may be binarized or otherwise treated as being binary, since annotations derived from n-grams are binary, as is the presence of each tag-value pair. In some example embodiments, the image processing machine 110 may treat any one or more these reference annotations as potential visual attributes. In some example embodiments, the preprocessing of the reference images also caps the maximum number of reference images for each attribute to 5000 images.

According to various example embodiments, both sources of annotations (e.g., unique tag-value pairs and n-grams from titles or captions) follow a power-law that results in a long-tailed distribution, in which there are many reference images for a few categories but fewer images for most categories. This kind of high imbalance may be alleviated by specifying a reasonable number of negative samples for a given attribute (e.g., a particular annotation), which may be based on the available number of possible samples for that attribute.

A reference image associated with a reference annotation may be considered as a positive image or a positive example for that annotation, in the sense that the reference image positively exhibits the characteristics conveyed by that annotation. However, negative images or negative examples may also be used by the image processing machine 110. For annotations obtained from n-grams, for example, the correlation module 240 may implement a closed-world assumption, which assumes that any reference image not associated with a given n-gram annotation is to be treated as a potential negative example for that n-gram annotation. For annotations derived from multi-valued tag-value pairs, in which the value of a tag may be any one of multiple possibilities, the correlation module 240 may select one or more negative examples based on the complements of the multivalued attribute. Accordingly, as an example, negative examples of items made of leather may be items that are made out of ivory, plastic, or metal.

In operation 420, the segmentation module 220 (e.g., within the trainer module 280) segments the reference image accessed in operation 410. The reference image may be segmented into a background portion (e.g., a reference background) and a foreground portion (e.g., a reference foreground, based on an outline (e.g., a full or partial silhouette) of the reference item depicted in the reference image. In particular, the reference background, the reference foreground, or both, may be defined by the outline of the reference item (e.g., one or more edges or borders of the reference item, as depicted in the reference image).

In some example embodiments, the segmentation module 220 implements an assumption that the reference image is centered on the reference item depicted therein. Accordingly, the segmentation module 220 may treat an outermost region (e.g., the outermost 10% of the pixels in the reference image) as "definitely background," an innermost region (e.g., the innermost 70% of the pixels) as "probably foreground," and the region in between (e.g., the pixels between the innermost 70% and the outermost 10%) as "probably background."

For example, a figure-ground segmentation algorithm (e.g., Grabcut algorithm) may be used to segment (e.g., separate) the background from the foreground, even in spite of a very weak initial labeling. As noted above, some example embodiments of the segmentation module 220 may define two rectangular areas: one covering 70% of the reference image (e.g., centered within the reference image) and another covering 90% of the reference image (e.g., also centered within the reference image). The innermost region may be considered (e.g., initially labeled) as probably foreground, and the outermost region may be considered as definitely background, with the remainder of the reference image being considered as probably background. Once the segmented foreground region has been identified, the foreground region may be utilized in at least two ways: a) to constrain the spatial pooling to the rectangle circumscribing the foreground portion (e.g., the foreground mask); and b) to sample locality-constrained linear codes that fall only within the foreground portion. This scheme may have the effect of improving the performance of the overall attribute-discovery process (e.g., improving the process for at least 17% of a total of 576 attributes for which there are more than 300 reference images).

In operation 430, the feature module 230 (e.g., within the trainer module 280) calculates a feature descriptor (e.g., a reference feature descriptor) based on (e.g., from) the segmented foreground portion (e.g., the reference foreground). As noted in FIG. 4, operation 430 may be repeated (e.g., to calculate multiple feature descriptors from a single reference image), which may have the effect of calculating a set of multiple feature descriptors by which the reference image may be characterized. Accordingly, the calculating of the feature descriptor may be part of calculating a group of reference feature descriptors from the segmented reference foreground, which may be defined by the outline of the reference item depicted in the reference image. In some example embodiments, each reference feature descriptor in such a group is a different visual word represented in the segmented reference foreground, and the group of reference feature descriptors may be represented (e.g., in memory, in the database 115, or both) as a histogram of the different visual words.

In some example embodiments, the feature module 230 is configured to calculate one or more of three different types of feature representations: local shape features (e.g., dense scale-invariant feature transform (Dense SIFT or DSIFT)), segmented localized shape features (e.g., Grabcut Localized Dense SIFT), and figure-ground segmented localized color (e.g., Grabcut Localized Color). To calculate a feature descriptor using local shape features (e.g., Dense SIFT), the feature module 230 may implement bag-of-visual-words feature representations with a combination of non-linear encoding and spatial binning. In some example embodiments, dictionary size and appropriate feature encodings may be important (e.g., crucial) for improved performance. Moreover, the bag-of-visual-words feature representations may at least match, if not outperform, other approaches that rely on higher level image representations. According to certain example embodiments, the feature module 230 is configured to calculate local shape (e.g., SIFT) feature descriptors, and such feature descriptors may be computed on a regular grid (e.g., at three different scales using a codebook of 10,000 descriptors). Furthermore, the feature module 230 may be configured to assign visual words using locality-constrained linear coding (e.g., with knn=5). In addition, the feature module 230 may be configured to use two levels for spatial pooling: 1) over the entire reference image, and 2) on a 3×3 grid covering the entire reference image.

For some contextual attributes (e.g., like a bedroom setting), the background of the reference image (e.g., content beyond the item of interest) may provide useful additional information. For other contextual attributes, the background may act as a distractor. To calculate a feature descriptor using segmented localized shape features (e.g., Grabcut Localized Dense SIFT), the feature module 230 may be configured to reduce the influence of (e.g., down-weight) one or more feature descriptors generated based on (e.g., from) the background portion of the reference image. However, in various example embodiments, performance of the image processing machine may be hindered. Additionally, even though the bag-of-visual-words approach may assume that visual features lack order, the spatial pooling performed may assume at least a coarse degree of registration.

In some example instances, the feature descriptor calculated in operation 430 is a shape descriptor calculated from the outline of the reference item whose outline defines the segmented reference foreground. In other example instances, the feature descriptor is a color descriptor calculated from one or more colors of the reference item (e.g., colors, patterns, or textures of the reference item, as depicted in the reference image).

In example embodiments that implement figure-ground segmented localized color (e.g., Grabcut Localized Color) in calculating a feature descriptor from the reference image, one or more color-specific patterns may be represented by the reference image annotation accessed in operation 410. Hence, the image processing machine 110 may be configured to facilitate predictions regarding when a user (e.g., user 132) will name some particular item as having certain color. For example, a white item (e.g., a chair or a lamp) might be annotated as being "white," but in the presence of a red feature (e.g., a cushion or lampshade), the user may be more likely to annotate the item as being "red." In various reference images, there may be dominant colors, and there may exist other biases regarding the location at which colors appear. Accordingly, some example embodiments of the feature module 230 are configured to calculate feature descriptors with respect to both global color and localized color (e.g., compute global color features and localized color features).

Although various color representations are suitable, certain example embodiments of the feature module 230 are configured to calculate such a feature descriptor by generating an illumination invariant color histogram from the reference image. In some situations, better localization with simpler color representations provides more accurate representations of color features than more complex color representations computed globally over the entire reference image. A set of feature descriptors that represent color features may be considered as a visual palette of color-attributes that correspond to the reference image and its annotations.

In some example embodiments, use of color-based feature descriptors improves the ability of the image processing machine 110 to accurately suggest or predict one or more color annotations (e.g., "green," "red," "blue," or "cream"). In certain example embodiments, use of color-based feature descriptors enhances the ability of the image processing machine 110 to accurately suggest or predict one or more material annotations (e.g., "black leather" or "ivory"). However, in certain situations, such color annotations and material annotations may represent only a small fraction of the attributes to be machine-learned.

In operation 440, the correlation module 240 generates a data structure that correlates the one or more feature descriptors (e.g., reference feature descriptors) calculated in operation 430 with their corresponding reference image annotations that were accessed in operation 410. For example, in example embodiments in which the calculating of the feature descriptor in operation 430 is part of calculating a group of reference feature descriptors from the segmented reference foreground, the generated data structure may correlate a reference image annotation with the calculated group of reference feature descriptors. The generated data structure may then be stored in the database 115 for subsequent use by the image processing machine 110 (e.g., during the query phase 302 of the workflow 300). As shown in FIG. 4, operations 410-440 may be performed for each reference image and its corresponding one or more annotations in the database 115. Accordingly, once generated, the data structure may be updated with additional correlations as the image processing machine 110 processes each feature descriptor calculated from each reference image.

For example, a binary linear support vector machine (SVM) may be trained for each potential visual attribute (e.g., from the previously discussed set of 1243 reference annotations). As noted above, each reference annotation may be treated as a binary value. According to various example embodiments, use of a feature encoding can avoid utilizing the more computationally expensive kernel-trick to learn non-linear functions using SVMs. This may have the effect of allowing the image processing machine 110 to machine-learn a relatively large set of models and discard the ones that seem less useful based on performance when used to suggest annotations for a validation set of images (e.g., a set of query images whose annotations are known and may be validated for testing the accuracy of the image processing machine 110).

Furthermore, according to some example embodiments, the correlation module 240 may calibrate each of the SVMs to obtain a well calibrated probabilistic output. For example, the correlation module 240 may fit a sigmoid using Platt scaling independently for each SVM on a small non-overlapping validation set (e.g., with a size of 50% of the number of reference images used for the training phase 301 of the workflow 300).

According to various example embodiments, the image processing machine 110 supports one or both of at least two services that apply the generated correlations between image annotations and foreground features of the reference images. In providing the first service, the image processing machine 110 functions as all or part of an annotation suggestion system (e.g., a tag recommendation system) for new images. In providing the second service, the image processing machine 110 functions as all or part of an iconic image discovery system.

In operation 450, the interface module 250 (e.g., within the query module 290) receives a query. The query may be submitted by the user 132 via the device 130 and received via the network 190. In operation 460, the interface module 250 provides a response to the query received in operation 450. The response may be provided to the user 132, via the network 190 (e.g., to the device 130 for presentation thereon to the user 132). Furthermore, the response may be generated, provided, or both, based on the data structure generated in operation 440.

In some example embodiments, the query includes an annotation (e.g., a query annotation) for which the user 132 is requesting a corresponding reference image (e.g., an iconic image that represents the submitted annotation). In such example embodiments, the resulting response provided in operation 460 includes a reference image (e.g., as a suggestion that the reference image is a representative and iconic image that is characterized by the submitted annotation).

In certain example embodiments, the query includes an image (e.g., query image) for which the user 132 is requesting a corresponding reference annotation (e.g., as a suggestion) for annotating or otherwise describing the submitted image. In such example embodiments, the resulting response provided in operation 460 includes a reference annotation (e.g., as a suggestion that the reference annotation characterizes the submitted image).

As shown in FIG. 5, the method 400 may include one or more of operations 520, 530, 550, 552, 554, 556, 560, and 562. Operation 520 may be performed after operation 420, in which the segmentation module 220 segments the reference image into a reference foreground and a reference background. In operation 520, the segmentation module 220 partitions the segmented reference foreground into multiple sections. Such sections may be non-overlapping rectangular regions of the reference image. For example, segmentation module 220 may apply a rectangular grid to the reference image and subdivide the reference image according to the rectangular grid. Moreover, the segmentation module 220 may generate feature descriptors from only those sections that contain at least a portion of the reference foreground.

In example embodiments that include operation 520, the calculating of the reference feature descriptor in operation 430 may be based on only one of the multiple sections partitioned from the reference foreground in operation 520. Hence, as shown in FIG. 5, performance of operation 430 may include performance of operation 530, in which the feature descriptors are calculated based on only one of these partitioned sections.

In some example embodiments, operation 550 is included in operation 450, in which the interface module 250 receives the user-submitted query. In operation 550, the interface module 250 receives a query annotation (e.g., as all or part of the query). In example embodiments that include operation 550, one or more of operations 552, 554, and 556 may be performed after operation 550. Furthermore, one or both of operations 560 and 562 may be performed as part (e.g., a precursor task, a subroutine, or a portion) of operation 460, in which the interface module 250 provides the response to the query.

In operation 552, the feature match module 270 (e.g., within the query module 290) determines that the submitted query annotation matches a reference image annotation associated with (e.g., previously applied to) a reference image, which may be the same reference image discussed above with respect operations 410-440. As discussed above, this reference image annotation may be correlated with a reference feature descriptor by the data structure generated or updated in operation 440.

In operation 554, the feature match module 270 obtains the correlated (e.g., corresponding) reference feature descriptor from the data structure, based on the results of operation 552 (e.g., based on the query image annotation matching the reference image annotation). For example, the reference feature descriptor may be obtained by accessing the database 115, which may store the reference feature descriptor (e.g., in addition to the data structure that correlates the reference feature descriptor with the reference image annotation).

In operation 556, the feature match module 270 accesses the reference image that corresponds to the obtained reference feature descriptor. This may be performed by accessing the database 115, which may store the reference image. Accordingly, the feature match module 270 may obtain (e.g., retrieve) the reference image and provide the reference image to the interface module 250 (e.g., for subsequent use in performing operation 460).

One or more of operations 560 and 562 may be performed as part of operation 460, in which the interface module 250 provides the response to the query. In operation 560, the interface module 250 provides the reference image obtained in operation 556 within the response to the query. In operation 562, the interface module 250 provides a suggestion that the reference image is an iconic image that represents the query annotation (e.g., by illustration or by example), is characterized by the query annotation, or both.

As shown in FIG. 6, the method 400 may include one or more of operations 650, 652, 654, 656, 658, 660, and 662. In certain example embodiments, operation 450 includes operation 650. Operations 520 and 530, which were described above, are also shown for context.

In certain example embodiments, operation 650 is included in operation 450, in which the interface module 250 receives the user-submitted query. In operation 650, the interface module 250 receives a query image (e.g., as all or part of the query). As noted above, the query image may depict a query item (e.g., an item whose attributes are not yet described in any annotation for the query image). In example embodiments that include operation 650, one or more of operations 652, 654, 656, and 658 may be performed after operation 650. Furthermore one or both of operations 660 and 662 may be performed as part of operation 460, in which the interface module 250 provides the response to the query.

In operation 652, the segmentation module 220 (e.g., under control of the feature match module 270 within the query module 290) segments the query image into a query background and a query foreground. This may be done in a manner similar to that described above with respect operation 420. Accordingly, the resulting query foreground may be defined by the outline of the query item depicted in the query image.

In operation 654, the feature module 230 (e.g., under the control of the feature match module 270) calculates a query feature descriptor based on (e.g., from) the query foreground that was segmented from the query image in operation 652. This may be performed in a manner similar to that described above with respect to operation 430. This process may also be repeated (e.g., to calculate multiple feature descriptors from a single query image), which may have the effect of calculating a set of multiple feature descriptors by which the query image may be characterized.

In operation 656, the feature match module 270 determines that the query feature descriptor matches a reference feature descriptor, which may be the reference feature descriptor discussed above with respect operations 410-440. As discussed above, this reference feature descriptor may be correlated with a reference image by the data structure generated or updated in operation 440.

In operation 658, the feature match module 270 obtains the reference image annotation correlated with the reference feature descriptor from the data structure generated or updated in operation 440 (e.g., based on the query feature descriptor matching the reference feature descriptor). For example, the reference image annotation may be obtained via accessing the database 115, which may store the reference image annotations that correspond to each reference image. Accordingly, the feature match module 270 may then provide the reference image annotation to be interface module 250 (e.g., for subsequent use in performing operation 460).

One or more of operations 660 and 662 may be performed as part of operation 460, in which the interface module 250 provides the response to the query. In operation 660, the interface module 250 provides the reference image annotation obtained in operation 658 within the response to the query. In operation 662, the interface module 250 provides a suggestion that the reference image annotation characterizes the query item depicted in the submitted query image, that the reference image annotation be applied to the query annotation, or both.

According to various example embodiments, one or more of the methodologies described herein may facilitate correlation of one or more image annotations with one or more foreground features of an image that depicts an item. Moreover, one or more of the methodologies described herein may facilitate provision of a suggested or recommended annotation in response to a user-submission of a query image that depicts a query item. Furthermore, one or more of the methodologies described herein may facilitate provision of an iconic image in response to a user-submitted query annotation (e.g., "rustic" or "What do rustic items look like?").

When these effects are considered in aggregate, one or more of the methodologies described herein may obviate a need for certain efforts or resources that otherwise would be involved in learning correlations between image annotations and attributes of items depicted in images. Efforts expended by a user in obtaining meaningful and accurate suggestions of annotations, images, or both, may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 7:
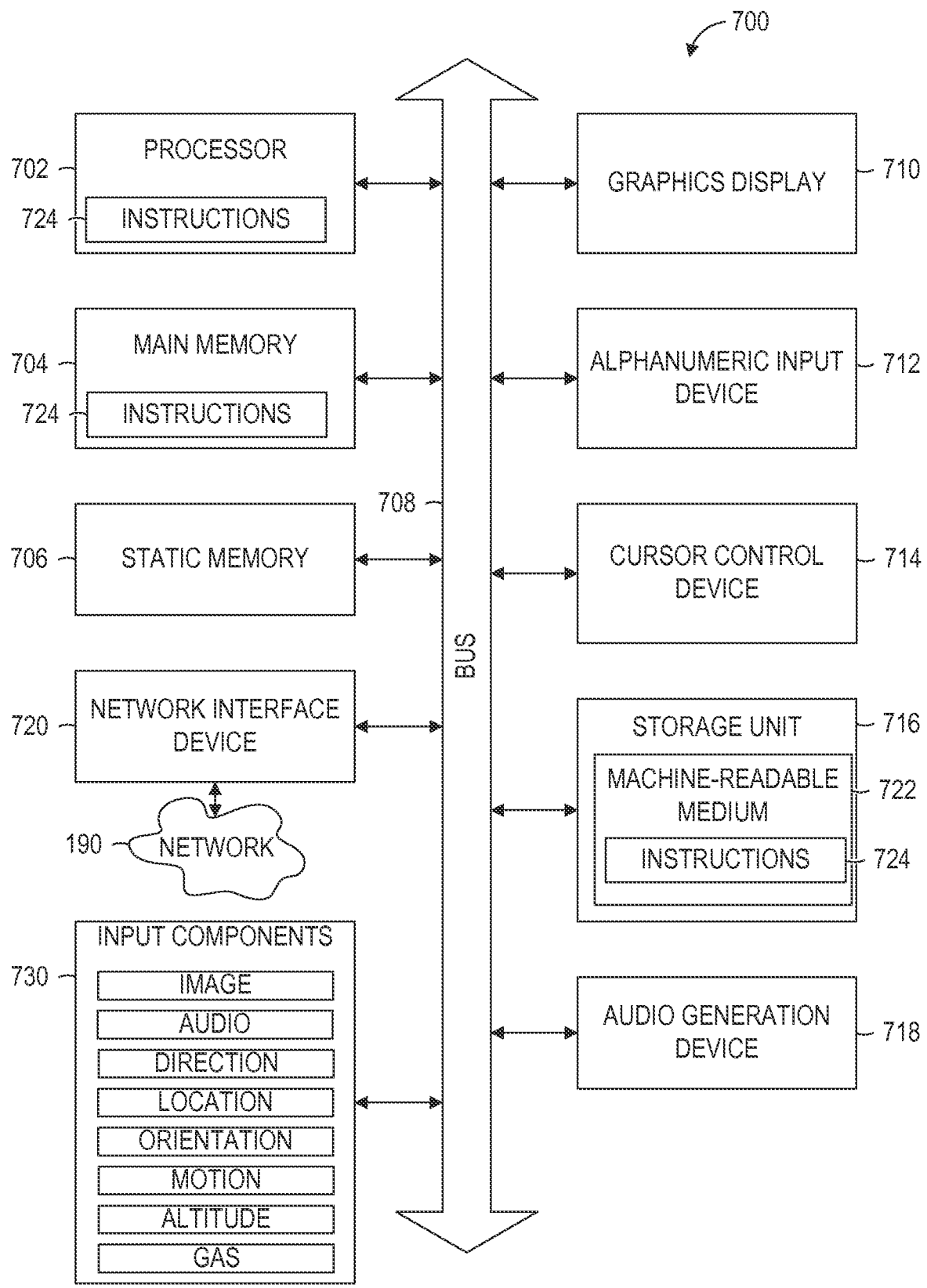
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions 724 from a machine-readable medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer system (e.g., a computer) within which the instructions 724 (e.g., software, a program, an application, an applet, an app, or other executable code) for causing the machine 700 to perform any one or more of the methodologies discussed herein may be executed, in whole or in part.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include any collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a cursor control device 714 (e.g., a mouse, a touchpad, a trackball, a joystick, a motion sensor, an eye tracking device, or other pointing instrument), a storage unit 716, an audio generation device 718 (e.g., a sound card, an amplifier, a speaker, a headphone jack, or any suitable combination thereof), and a network interface device 720.

The storage unit 716 includes the machine-readable medium 722 (e.g., a tangible and non-transitory machine-readable storage medium) on which are stored the instructions 724 embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered machine-readable media (e.g., tangible and non-transitory machine-readable media). The instructions 724 may be transmitted or received over the network 190 via the network interface device 720. For example, the network interface device 720 may communicate the instructions 724 using any one or more transfer protocols (e.g., hypertext transfer protocol (HTTP)).

In some example embodiments, the machine 700 may be a portable computing device, such as a smart phone or tablet computer, and have one or more additional input components 730 (e.g., sensors or gauges). Examples of such input components 730 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 724 for execution by the machine 700, such that the instructions 724, when executed by one or more processors of the machine 700 (e.g., processor 702), cause the machine 700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g. an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method, comprising:
accessing a reference furniture image of a reference furniture item and a set of item annotations that is an existing set of item annotations applied to the reference furniture image and is descriptive of the reference furniture item depicted in the reference furniture image;
calculating a plurality of reference feature descriptors from the reference furniture image, wherein the calculating of the plurality of reference feature descriptors comprises:
defining a first portion of the reference furniture image;
defining a second portion of the reference furniture image, the first portion and the second portion at least partially overlapping;
determining the first portion represents a foreground and a third portion of the reference furniture image represents a background, the third portion being outside of the second portion;
determining whether an overlapping portion represents the background, the overlapping portion extending between the first portion and the third portion;
determining dense scale-invariant feature transform (SIFT) features within the reference furniture image on a regular grid at three different scales, the determining constrained to the foreground of the reference furniture image, and
assigning visual words using locality-constrained linear coding (LLC) sampled from only the foreground of the reference furniture image, wherein the dense SIFT features are determined using a first global level with respect to the reference furniture image and a second level comprised of a plurality of grids;
correlating the plurality of reference feature descriptors with one or more item annotations in the set of item annotations; and
generating a data structure that comprises the plurality of reference feature descriptors with the correlated one or more item annotations.

2. The method of claim 1, further comprising:
segmenting the reference furniture image into the background and the foreground defined by an outline of the reference furniture item;
partitioning the segmented foreground into multiple sections; and
wherein the calculating of the plurality of reference feature descriptors calculates a local feature descriptor based on only one section among the multiple sections partitioned from the segmented foreground.

3. The method of claim 2 wherein:
a reference feature descriptor of the generated data structure is a color descriptor calculated from a color of the reference item whose outline defines the segmented foreground.

4. The method of claim 2, wherein:
a reference feature descriptor of the generated data structure is a shape descriptor calculated from the outline of the reference item whose outline defines the segmented foreground.

5. The method of claim 2, wherein:
the one or more item annotations is a name-value pair that specifies an attribute of the reference furniture item depicted in the reference furniture image and whose outline defines the segmented foreground.

6. The method of claim 1, further comprising:
receiving a query from a user; and
providing the user with a response to the query based on the generated data structure, wherein the received query includes a query annotation;
determining that the query annotation matches the one or more item annotations correlated with a reference feature descriptor of the generated data structure;
obtaining the reference feature descriptor from the generated data structure based on the query annotation matching the one or more item annotations;
accessing the reference furniture image based on the obtained reference feature descriptor; and
wherein the providing of the response comprises providing the reference furniture image in the response.

7. The method of claim 6, wherein:
the providing of the response comprises providing a suggestion that the reference furniture image is characterized by the query annotation.

8. The method of claim 6, wherein:
the received query comprises a query image that depicts a query item; and
the method further comprises:
segmenting the query image into a query background and a query foreground defined by an outline of the query item;
calculating a query feature descriptor based on the query foreground defined by the outline of the query item;
determining that the query feature descriptor matches a reference feature descriptor of the generated data structure;
obtaining the one or more item annotations correlated with the reference feature descriptor from the generated data structure based on the query feature descriptor matching the reference feature descriptor; and
the providing of the response comprises providing the one or more item annotations in the response.

9. The method of claim 8, wherein:
the providing of the response comprises providing a suggestion that the one or more item annotations be applied to the query image.

10. The method of claim 1, wherein: the one or more item annotations is an n-gram included within a caption of the reference furniture image, the caption being submitted by a seller of the reference item depicted in the reference furniture image.

11. The method of claim 1, wherein:
the one or more item annotations is a keyword submitted as a tag for the image by a seller of the reference item.

12. The method of claim 1, wherein the first portion covers 70% of the reference furniture image and the second portion covers 90% of the reference furniture image.

13. The method of claim 1, wherein the locality-constrained linear coding uses a K-nearest neighbors (knn) value of five (5).

14. The method of claim 1, further comprising generating at least some of the plurality of reference feature descriptors using illumination invariant color histogram.

15. A system comprising:
one or more hardware processors configured to perform operations comprising:
accessing a reference furniture image of a reference item and a set of item annotations that is an existing set of item annotations applied to the reference furniture image and is descriptive of the reference item depicted in the reference furniture image;
calculating a plurality of reference feature descriptors from the reference furniture image, wherein the calculating of the plurality of reference feature descriptors comprises:
defining a first portion of the reference furniture image;
defining a second portion of the reference furniture image, the first portion and the second portion at least partially overlapping;
determining the first portion represents a foreground and a third portion of the reference furniture image represents a background, the third portion being outside of the second portion;
determining whether an overlapping portion represents the background, the overlapping portion extending between the first portion and the third portion;
determining dense scale-invariant feature transform (SIFT) features within the reference furniture image on a regular grid at three different scales, the determining constrained to the foreground of the reference furniture image, and
assigning visual words using locality-constrained linear coding sampled from only the foreground of the reference furniture image, wherein the dense SIFT features are determined using a first global level with respect to the reference furniture image and a second level comprised of a plurality of grids;
correlating the plurality of reference feature descriptors with one or more item annotations in the set of item annotations; and
generating a data structure that comprises the plurality of reference feature descriptors with the correlated one or more item annotations.

16. The system of claim 15, the operations further comprising:
receiving a query from a user;
providing the user with a response to the query based on the generated data structure, wherein the received query includes a query annotation;
determining that the query annotation matches the one or more item annotations correlated with a reference feature descriptor of the generated data structure;
obtaining the reference feature descriptor from the generated data structure based on the query annotation matching the one or more item annotations;
accessing the reference furniture image based on the obtained reference feature descriptor; and
providing the reference furniture image in the response.

17. The system of claim 15, the operations further comprising:
 receiving a query from a user;
 providing the user with a response to the query based on the generated data structure, wherein the received query includes a query image that depicts a query item;
 segmenting the query image into a query background and a query foreground defined by an outline of the query item;
 calculating a query feature descriptor based on the query foreground defined by the outline of the query item;
 determining that the query feature descriptor matches a reference feature descriptor of the generated data structure;
 obtaining the one or more item annotations correlated with the reference feature descriptor from the generated data structure based on the query feature descriptor matching the reference feature descriptor; and
 providing the one or more item annotations in the response.

18. A non-transitory machine-readable storage medium comprising instructions that, when executed by one or more processors of a machine, cause the machine to perform operations comprising:
 accessing a reference furniture image of a reference item and a set of item annotations that is an existing set of item annotations applied to the reference item and is descriptive of the reference item depicted in the reference furniture image;
 calculating a plurality of reference feature descriptors from the reference furniture image, wherein the calculating of the plurality of reference feature descriptors comprises:
  defining a first portion of the reference furniture image;
  defining a second portion of the reference furniture image, the first portion and the second portion at least partially overlapping;
  determining the first portion represents a foreground and a third portion of the reference furniture image represents a background, the third portion being outside of the second portion; and
  determining whether an overlapping portion represents the background, the overlapping portion extending between the first portion and the third portion;
 correlating the plurality of reference feature descriptors with one or more item annotations in the set of item annotations;
 generating a data structure that comprises the plurality of reference feature descriptors with the correlated one or more item annotations;
 receiving a query from a user; and
 providing the user with a response to the query based on the generated data structure.

19. The non-transitory machine-readable storage medium of claim 18, wherein the operations further comprise:
 segmenting the reference furniture image into the background and the foreground defined by an outline of the reference item; and
 partitioning the segmented foreground into multiple sections; and wherein the calculating of a reference feature descriptor of the generated data structure includes calculating a local feature descriptor based on only one section among the multiple sections partitioned from the segmented foreground.

\* \* \* \* \*